(12) United States Patent
Hicks

(10) Patent No.: US 7,559,870 B2
(45) Date of Patent: Jul. 14, 2009

(54) TORQUE-LIMITING COUPLING

(75) Inventor: Raymond John Hicks, Powys (GB)

(73) Assignee: Orbital 2 Ltd, Llangammarch Wells, Powys (GB)

( * ) Notice: Subject to any disclaimer, the term of this patent is extended or adjusted under 35 U.S.C. 154(b) by 388 days.

(21) Appl. No.: 10/545,943

(22) PCT Filed: Feb. 18, 2004

(86) PCT No.: PCT/GB2004/000641

§ 371 (c)(1),
(2), (4) Date: May 9, 2006

(87) PCT Pub. No.: WO2004/074711

PCT Pub. Date: Sep. 2, 2004

(65) Prior Publication Data

US 2006/0240930 A1    Oct. 26, 2006

(30) Foreign Application Priority Data

Feb. 18, 2003    (GB) .................. 0303651.4

(51) Int. Cl.
*F16H 3/74*    (2006.01)
*F16H 48/30*   (2006.01)
*F16H 3/44*    (2006.01)
*F16H 57/08*   (2006.01)
*F16D 7/02*    (2006.01)

(52) U.S. Cl. .................. 475/257; 475/88; 475/293; 475/341; 192/56.1

(58) Field of Classification Search ........... 475/84, 475/86, 87, 88, 89, 90, 91, 94, 95, 96, 296, 475/293, 341, 346, 347, 257, 262, 263, 264, 475/266; 192/55.1, 56.1, 56.3, 56.55, 56.61
See application file for complete search history.

(56) References Cited

U.S. PATENT DOCUMENTS

| | | | |
|---|---|---|---|
| 1,903,714 A |   | 4/1933 | Frias et al. |
| 2,330,374 A |   | 9/1943 | Orner |
| 2,590,305 A |   | 3/1952 | Foster |
| 2,921,483 A |   | 1/1960 | Colmerauer |
| 3,060,767 A | * | 10/1962 | Parrett ................ 475/183 |
| 3,742,782 A |   | 7/1973 | Doran |
| 3,757,605 A | * | 9/1973 | Morden ............... 475/266 |
| 4,272,993 A |   | 6/1981 | Kopich |
| 6,705,966 B2 | * | 3/2004 | Schroder et al. ......... 475/249 |
| 6,974,401 B2 | * | 12/2005 | O'Leary et al. ......... 475/347 |

FOREIGN PATENT DOCUMENTS

| | | |
|---|---|---|
| GB | 478223 | 1/1938 |
| GB | 533125 | 2/1941 |
| GB | 547534 | 9/1942 |
| GB | 854006 | 11/1960 |

\* cited by examiner

*Primary Examiner*—Roger Pang
(74) *Attorney, Agent, or Firm*—King & Schickli, PLLC

(57) ABSTRACT

A torque limiting coupling including: (a) an input gear (7) and an output (8) gear interconnected by a torque limiting device; (b) gear chain (9) interconnecting the input and output gears; and (c) a torque limiting device which retains the gear train (7, 8, 9) to prevent relative rotation of the gear train (7, 8, 9) and the input (7) and output gears (8) to provide a 1:1 input output ratio below a predetermined level of input torque and releases the gear train to allow relative rotation between the input (7) and output gears (8) at or above the predetermined level whereby excess torque is dissipated.

6 Claims, 10 Drawing Sheets

TORQUE-LIMITING COUPLING

The present invention relates to a torque-limiting coupling and in particular, but not exclusively, to a torque-limiting coupling that allows a degree of "slip" between gears receiving power from a power input, thereby evening out power surges and/or transmission torque fluctuations at the output to a generator. The coupling of the present invention has particular application to a power generating system such as a wind-driven turbine.

Power generators ideally need to be driven by an even or generally level input of power. Generators that are driven by non-constant power sources such as the wind or waves, by the nature of the power input, are subject to fluctuations in the speed/torque transmitted to the generator via the input. The prime mover for a wind generator is a set of turbine blades. The rotational speed of the blades is relatively low and they sweep over a very large area, over which wind speed and air density vary constantly, giving rise to continuous multiple speed fluctuations of the blades during each revolution. In a fixed ratio transmission these fluctuations result in peaks and troughs in the torque transmitted by the power input. To avoid fatigue-induced damage and wear on gear trains transmitting torque from an input to an output, it is desirable to even out such torque fluctuations.

Known mechanisms for this purpose, for example, involve the use of asynchronous generators to limit torque fluctuations. However these systems involve expensive and sometimes extensive modifications to a power generator to enable them to operate and while these improve power quality they cannot compensate for the transient mechanical torques induced by the acceleration of the generator's rotor inertia. U.S. Pat. No. 5,140,170 discuses the use of a separate hydraulic positive displacement pump and a hydraulic fluid to allow slip between gears in a power generating system. However, this known system involves a dedicated transmission having an additional differential gear stage to provide what would otherwise be a stationary reaction member, whose rotation is controlled by a positive displacement pump which discharges through an appropriate relief valve, whenever the torque exceeds a set value. Such a pump additionally needs to have a hydraulic power pack to supply a boost pressure to the suction side to make up for leakage losses in the system.

From a first aspect the invention consists in a torque limiting coupling including:

(a) an input gear and an output gear interconnected by a torque limiting device;
(b) gear chain interconnecting the input and output gears; and
(c) a torque limiting device which retains the gear train to prevent relative rotation of the gear train and the input and output gears to provide a 1:1 input/output ratio below a predetermined level of input torque and releases the gear train to allow relative rotation between the input and output gears at or above the predetermined level whereby excess torque is absorbed.

Expressed alternatively the invention is the provision of an interconnection between a power input and output which locks the power input and output for rotation one with the other up to a predetermined level or torque and then at or above that level allows relative rotation between the input and the output so that the torque provided to the output will not exceed the predetermined level. As will be seen from the description, this configuration can be achieved in a number of different ways.

Thus the input and output gears may be mounted on a common rotatable carrier and the input gear may have fewer teeth than the output gear to determine the extent of relative rotation.

The torque limiting device may include at least one gear pump coupled to the gear chain and acting in a sense to pressurise a chamber closed by a pressure relief valve such that until the pressure in the chamber reaches a predetermined level, determined by the pressure relief valve, the gear pump, and hence the gear chain is locked, but when the pressure relief valve opens, the pump and hence the gear chain can rotate allowing relative rotation between the input and output gears.

The torque limiting device may include a clutch connected to the gear chain to lock the gear chain below a predetermined level of torque and to allow rotation of the gear chain and hence relative rotation between the input and output gears above or at the predetermined level. The clutch may be a frictional fluid clutch.

In an alternative embodiment the gear chain is connected in parallel with the input and output gears and has two parts, one drivingly connected to the input gear and one drivingly connected to the output gear and a clutch or other variable connection between the parts whereby below the predetermined level the gear lock train is locked and above the predetermined level the two parts can rotate relative to each other. In that case the variable connection may alter the predetermined level to vary the effective ratio between the input and output gears.

According to another aspect the present invention there is provided a torque-limiting coupling and in particular a substantially fully self-contained torque-limiting coupling having equal and opposite input and output torques, said device including a housing for oil, a gear train within the housing, and couplings to input and output gears, and one or more pumps driven by intermediate gearing between the input and output gears, said pump(s) being adapted to take oil from the housing and delivering it into a chamber closed by a relief valve, such that, up to and below a predetermined pressure, a hydraulic lock is imposed on the pump(s), which thereby locks the intermediate gearing to cause the input and output gears to rotate in unison, but when the pressure exceeds the predetermined pressure, the valve is forced open, allowing the pump(s) and therefore its intermediate gears to rotate to cause differential rotation of the input and output gears.

This in particular allows for the production of a torque-limiting coupling having a rotating housing, which serves as an annular oil reservoir, subject to centrifugally generated pressure, a first gear connectable to a power input and a second gear connectable to a power output, the first gear driving the second gear via a plurality of planet gears mounted in a carrier which also houses a plurality of gear pumps driven by the planet gears, each of said gear pumps having driving and driven gear wheels adapted to provide a radial oil flow from the rotating housing into a common chamber housed within the carrier, the pressure in the chamber being controlled by an adjustable pressure relief valve to control oil flow through the torque-limiting device, wherein when the pump gears are locked, thereby preventing oil from passing into the chamber until there is an oil pressure build up causing relative rotation of the driving and driven wheels so that transient slip occurs between the first and second gears to allow speed/torque fluctuations at the power input to be substantially instantly evened out, thereby bringing them back to synchronous rotation.

It is preferred that the gear train comprises a gear input and a gear output, which are geared with a planet gear forming the intermediate gearing.

Preferably, the intermediate gearing comprises one or more planet gears, which mesh with the input and output gears with the planet gears mounted in a carrier which also houses a commensurate number of gear pump(s), each comprising a pair of gears driven by its planet gear. It is envisaged that this carrier has a central chamber into which the gear pump(s) deliver the oil.

It is envisaged that each of the driving and driven gears are adapted to rotate one relative to the other so providing a gear pump to control oil flow to the chamber. The relative rotation occurs when the intermediate gear applies sufficient torque to the gear pump to overcome pressure difference between the outer case and the preset pressure of the inner chamber which causes the driving and driven gears to contra-rotate thereby enabling them to act as a pump to gear oil from one part of the device to the other.

It is preferred that the gear pumps are each associated with a conduit or duct leading to the chamber with the valve. However, it is envisaged that two or more planet gears may feed into a common conduit or duct leading to the chamber.

In a preferred embodiment, the carrier has five gear pumps whose displacement and pressure may be varied according to the degree of slip required for a particular power generator. Typically, the gear pumps have driving and driven gears each having 9 teeth.

The valve is preferably a one-way pressure relief valve, for example an adjustable spring valve. Ideally, the valve may be adjusted so that a pressure is maintained in the chamber, which can accommodate a normal full torque load transmitted to the gear train. This adjustment will provide the predetermined pressure level for the chamber at which the hydraulic lock becomes locked or unlocked.

Preferably the torque-limiting coupling is provided to be inserted between a power input and a power output. This allows for the device to be retro fitted to existing machinery. The dimensions of the device may be altered according to the requirements of the machinery that it is to operate with.

It is also envisaged that the coupling may be an integral part of a power transmission device. The device may be incorporated directly into the machinery, either in the transmission or equally into the driving or driven machinery, depending on the design and costs of inclusion in the machinery.

Preferably, the gear train has an epicyclic gearing configuration. A particularly effective maximum gear ratio for the torque-compensating device is a 18.8/17.8 ratio. Such a gear train includes an input gear having an annulus with 89 teeth and an output gear having an annulus with 94 teeth, However, these figures are can be varied, so providing different amounts of relative rotation, depending on the requirements stemming from the high inertia of the generator when referred to the low speed prime mover. Typically, when the main primary gearbox has a fixed step-up ration of 60/1 the referred inertia of the generator is its polar moment about its own axis multiplied by the ratio squared i.e. 3600 times.

Ideally, the difference in number of the teeth on the annulus for the input gear and the annulus for the output gear is equal to the number of gear pumps in the carrier. For example, the difference between the previously mentioned 89 and 94 teeth is five and therefore five gear pumps would be present.

The device is particularly adapted to provide a torque-limiting device for wind turbines. However, there is a range of ways of generating power in a system, other than wind power and the torque limiting device of the invention could be used in other situations where there is a need to reduce fluctuations to effect improved reliability and optimum sizing of transmission components.

Wind turbines typically are used to drive an electrical generator which is connected to the national grid. The grid operates using certain frequencies, voltages and phases and these characteristics may dictate the set speed for the rotation of the turbine. The typical step up ratio of power from the blades of a turbine to the generator is usually from 30 to 90. This ratio is dependent on the turbine capacity because the rotational speed of a turbine blade is inversely proportional to its tip diameter. This means that higher power machines run, perforce, at lower speeds, whereas generators that provide a power output are limited to set speeds (typically 1000 or 1500 rev/min).

Thus for a 600 kW wind turbine having a step up ratio of 56:1, the effective inertia of the generator, when referred to the turbine, is equivalent to the polar moment of inertia about its own axis multiplied by the ratio squared, i.e. over 3000 times.

Therefore, it is clear that the device of the present invention provides a reliable and compact way of allowing the transmission to slip and absorb any speed fluctuations as they occur, thereby deviating the torque increase created by the acceleration of the large driven machine inertia. This leads to a combined increase in reliability and for a reduction in transmission size for power generators. Because the device of the present invention provides a particularly compact and self contained arrangement it is particularly useful for retrofitting in existing machines.

Embodiments of the invention will now be described, by way of example only, with reference to the accompanying figures in which:

FIG. 1: shows a stepped cross-sectional view of a torque-limiting coupling according to an embodiment of the invention;

FIG. 2: shows a sectional view of a carrier and planet gears as incorporated in the device of FIG. 1;

Figure 1:
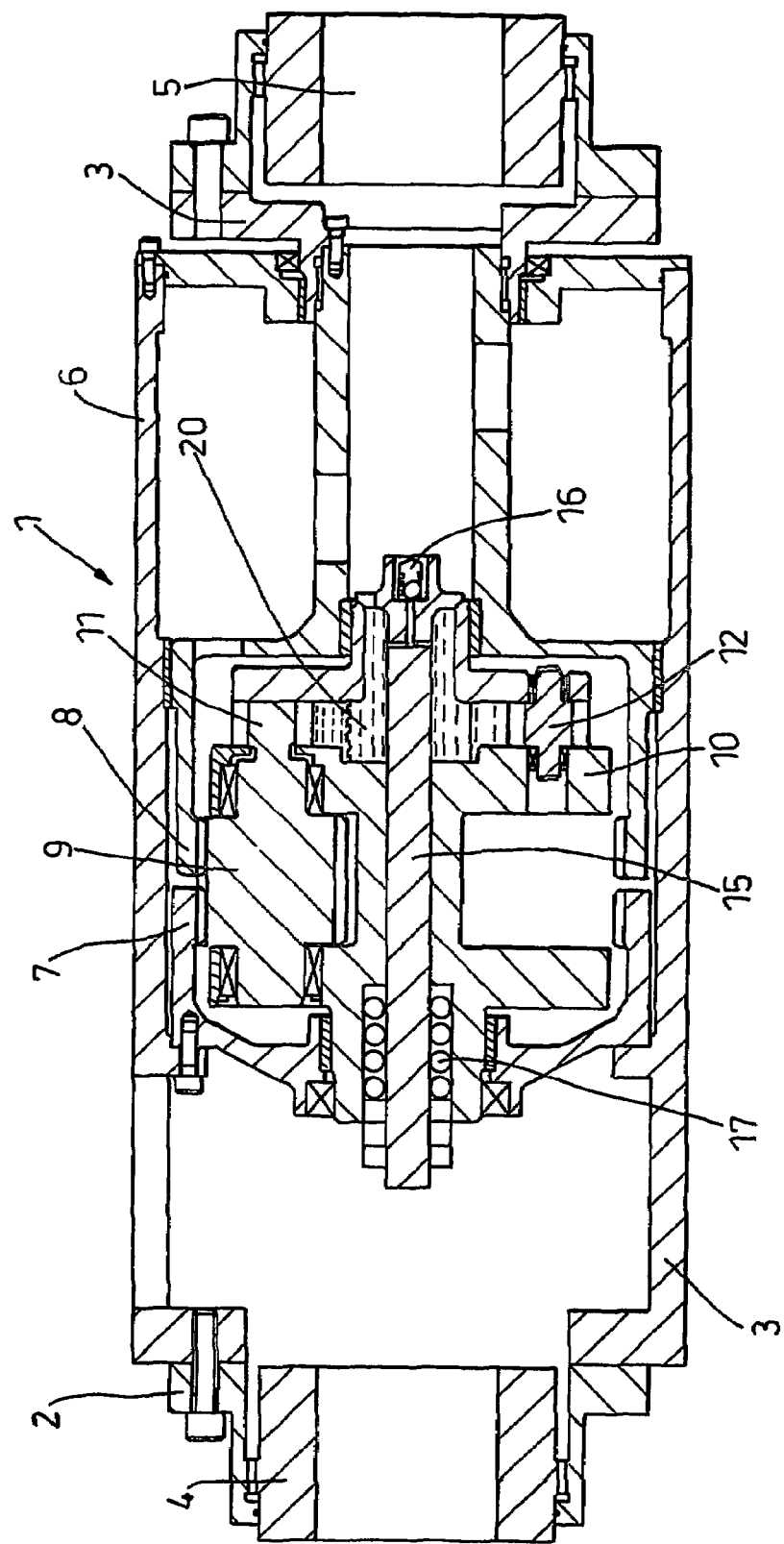

A torque-limiting coupling, generally shown as 1 in FIG. 1, comprises a linear arrangement having an input at a first end coupled to a housing for an epicyclic gear arrangement. The gear arrangement includes input and output wheels which are geared to a planet gear. The planet gear includes a carrier having gear pumps to control flow of hydraulic fluid/oil in the device. The gear arrangement is also connected to an output at the other end of the device. As shown in FIG. 1, there are conventional gear half couplings 2, 3, (or any other proprietary couplings), which are coupled to an input 4 and an output 5 respectively. Between the input and output, there is a torque-limiting device, which is also referred to as a "spacer element" and this houses the gearing, pump and valves of the torque-limiting device 1. This arrangement allows the coupling 1 to be mounted between the driving and driven machines in the same manner as a conventional gear coupling (with spacer), with the same tolerance misalignment as conventional gear couplings. This arrangement avoids the need to alter existing parts of the transmission to accommodate the device 1.

The torque-compensating device 1 is formed of a housing 6, extending axially between the half couplings 2,3. The housing 6 accommodates an epicyclic gear train formed of input and output annular gears 7,8 which mesh with one or more intermediate planet gear(s) 9. The planet gear 9 leads to a carrier 10 with supports gear wheels 11,12 forming the gear pump. The carrier 10 is usually a wheel but it is envisaged that other arrangements that provide rotation can operate as a carrier.

As has already been mentioned the input annular gear 7 can have 89 teeth and the output annular gear 8 can have 94. This means that 89 units of torque can be transmitted through the planet gear(s) 9 and 5 units are transmitted through the carrier 10, so that the output annulus receives 94 units of torque. Thus, whilst the planet gear(s) 9 is locked against rotation the torque limiting device provides a straight 1:1 ratio between the input 4 and output 5.

However, when, as explained below, the planet gear(s) 9 are allowed to rotate, torque is relieved between the input gear 7 and the output gear 8, in which case, by choosing the point at which the planet gear(s) 9 can rotate, the upper value of the torque can be limited, preventing torque surges being transmitted to the output 5.

The gear wheels 9 form a gear pump, which are mounted by bearings on the carrier 10 and can rotate about their own axis.

Figure 2:
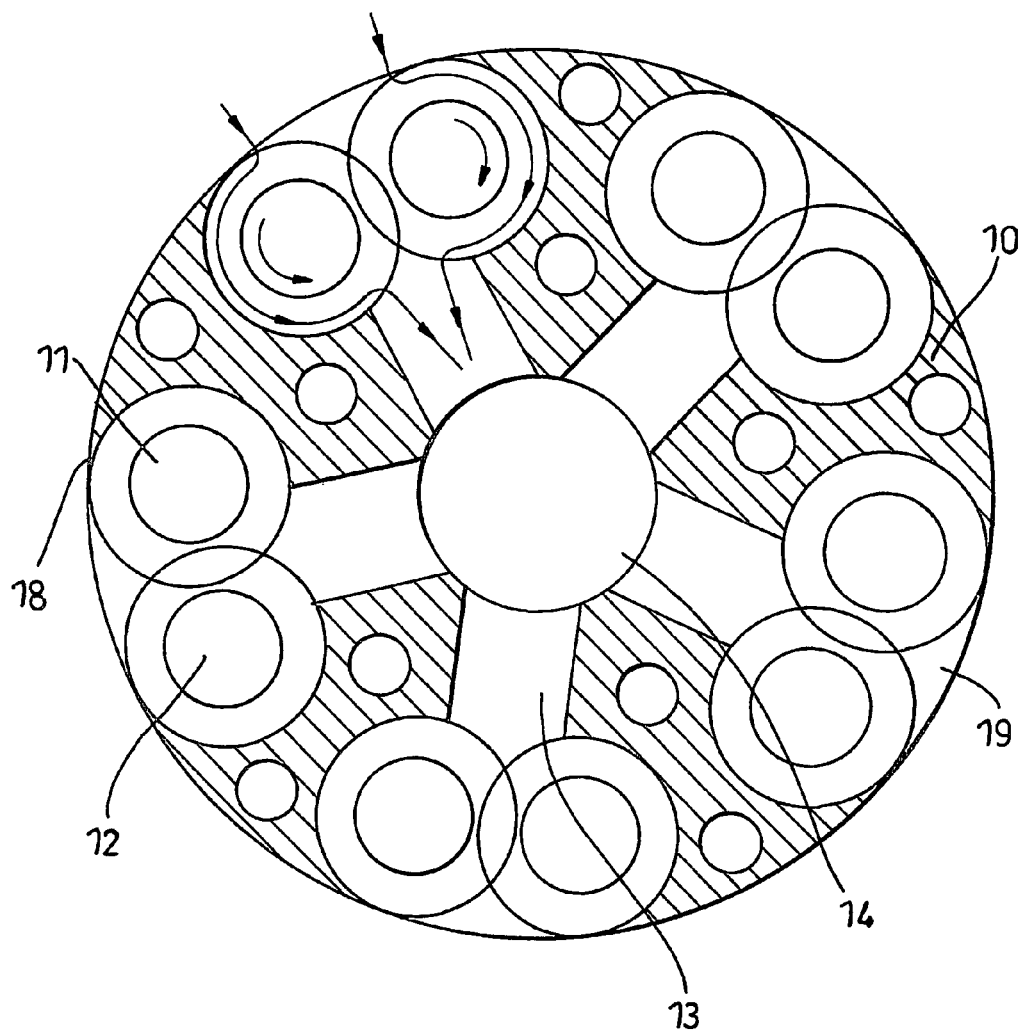

FIG. 2 shows an end sectional view of the carrier 10 and gear pump arrangement. The carrier 10 houses the gear pumps, comprising a driving gear wheel 11 and a driven gear wheel 12, which may (or may not be) identical and which mesh with one another so that rotation of one wheel causes the rotation of the other. Also, locking of one wheel locks the other. Although wheels are shown, it could be that other types of gear structures could be used, for example, balls or rings but they do require an annulus having parts that can mesh with another gear. There is a plurality of the gear pumps situated towards and around the periphery of the carrier 10, the gear pumps being bounded by a housing 18 within the carrier 10. It is the combination of the wheels 11 and 12, together with their housing 18 in the carrier 10 that form each gear pump.

Ports 19 are arranged in the housing 18, at the outside edge of the carrier 10 with the result that any suction produced by the gear pump is towards the edge of the carrier. The gear pumps are each associated with a respective conduit 13 radiating into a central common chamber 14 in the carrier from which oil can only escape via a pressure relief valve 15 which controls pressure in the chamber 14.

As shown in FIG. 1, the valve 15 comprises a non-return valve part at one end and a valve spring 17 at the other end. Towards the non-return valve part there is a conduit leading to a chamber filled with oil 20.

The oil 20 lubricates the rotating parts of the gear train and provides the medium for absorbing the overloads in torque transmission.

During normal 1:1 ratio operation, the valve 15 is spring loaded in the closed position. The spring pressure is adjustable and can be set to allow opening movement of the valve 15 only when a predetermined oil pressure is reached within the chamber 14. The valve 15 keeps chamber 14 pressurised and so the chamber 14 acts as a hydraulic stop/lock preventing the wheels 11,12 of the gear pump from rotating. When the gear pump wheels are prevented from rotating, then the associated planet gear is also prevented from rotating with the consequence that the planet gear together with the input and output gears 7,8 with which its meshes are locked and this results in the whole gear train rotating as one entity when driven by the input 4 as there is no relative gear rotation for the gears of the torque-limiting device.

The valve spring 17, is adjusted to keep the valve closed up to a predetermined pressure within the chamber 14 and this pressure is set so it relates directly to the normal full load torque to be transmitted through the coupling. Thus under normal running conditions the gear is locked and there are substantially no losses in transmission.

When there are surges in torque at the input 4, there is an increase in oil pressure at the gear pumps and this additional pressure causes the driven and driving wheels 11,12 of the gear pump to counter rotate. The direction of rotation is shown as arrows in FIG. 2. The additional pressure causes oil to be pumped to chamber 14 at constant pressure. The rotation of the gear pumps relieves pressure in the device 1 and allows relative motion between the planet gear(s) and input and output gears 7,8. The speed of the input 4 as a result of a surge in torque and the duration of the surge, controls the quantity of oil that is pumped by the gear pumps. The linear power increase at the input 4 is absorbed by the gear pumps, and the greater the increase in speed at the input, the greater the power absorbed by the action of the gear pumps. Thus the added rotation of the input gear 7 results in rotation of the planet gear and its associated gear pump until the torque/speed fluctuation has been dissipated. As a result of dealing with the power surge upstream, the output gear is not subject to such fluctuations in speed of rotation and remains at a constant rotational speed, which is transmitted to and is matched to the requirements of the generator.

The power absorbed by the gear pumps generates heat within the circulating oil 20. Oil circulates through the pumps, valve, then moves outwards under centrifugal force within the rotating housing for the device 1 and is recirculated, by being drawn into the gear pump(s). This heat may be passively dissipated through the housing 6 via its outer surface. It is envisaged that a particularly conductive material can be used for the housing, such as aluminium. However, whatever material is used, the housing may incorporate scrolled fins/blades to maximise surface area and which will draw ducted air across the surface to assist cooling.

Whilst the transient increase in speed of a gear pump might be as high as 5%, most of the gust energy is absorbed by increasing the kinetic energy of the rotor and so the transient increase is only sustained for a relatively short period of the rotational cycle. The complementary negative reduction of speed is recovered as kinetic energy reduces again.

Overrun conditions, when the generator inertia back drives, will be obviated by the non-return valve incorporated in the valve body. Overrun conditions result in reversal of pump direction of rotation and suction. In these circumstances the pumps will suck oil from the central chamber followed by air/oil mix through the non-return valve. The air will prevent effective power transmissions and thus prevent overrun power transmission back through the coupling.

As will be seen from the further Figures modifications can be made to the gear train to control output to driven machinery. For example, clutches may be associated with the input or additional control of torque through the transmission can be effected using a sprag unit. It may also be the case that an offset stepped gear train is used but still, "slip" between gears in the transmission will be controlled by the torque-limiting device of the invention.

Figure 3:
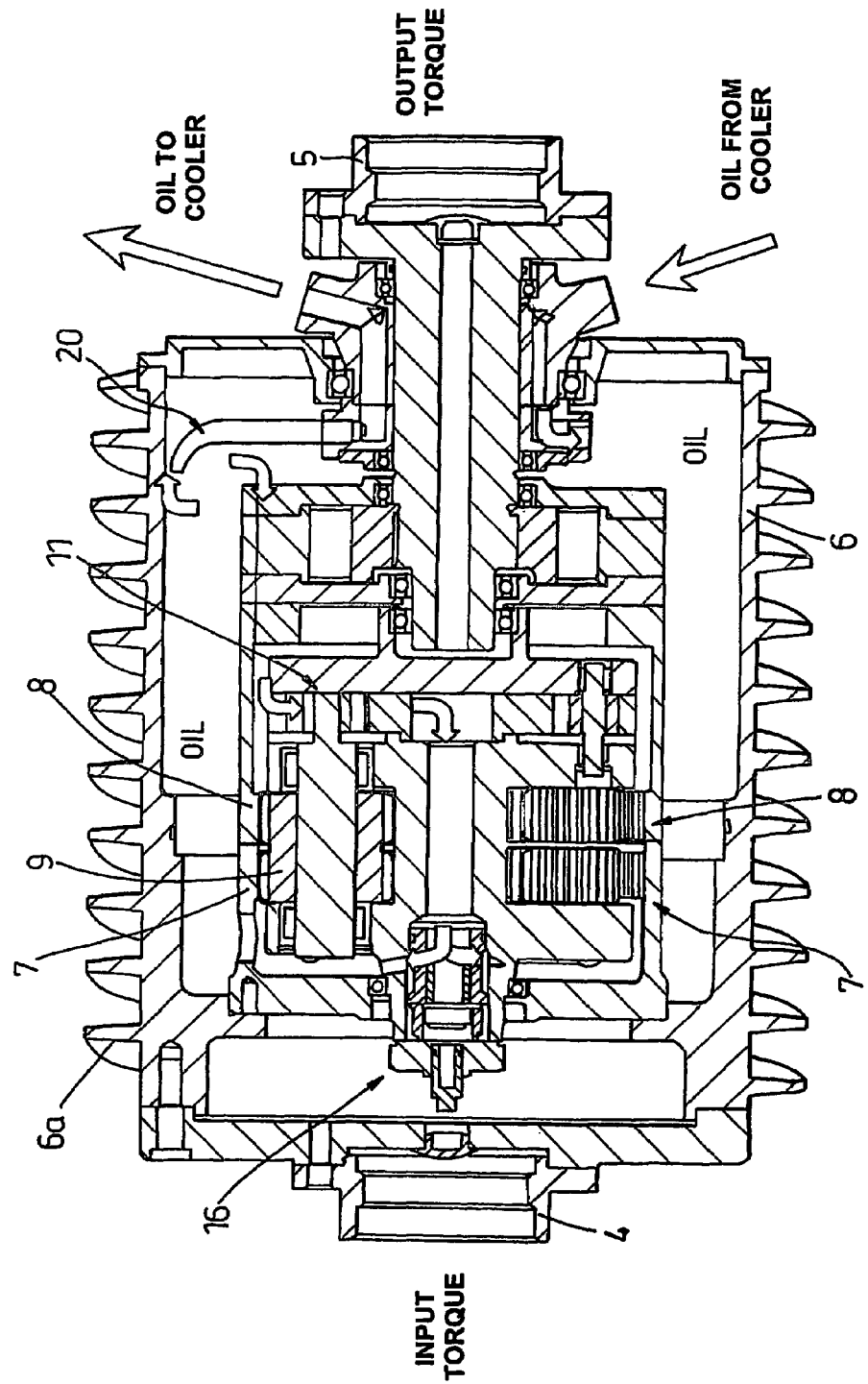
FIG. 3 is a detailed cross-sectional view of the embodiment of FIG. 1 illustrating additional features such as oil-cooling.

Turning to FIG. 3 like parts have been given the same numbering as in FIGS. 1 and 2 and its operation is essentially the same. It will be noted that the outer casing 6 is alternatively shaped to provide a more suitable oil reservoir and is provided with cooling fins 6a and that an oil cooling circuit is provided as indicated by the grey arrows adjacent the output shaft 5 and incorporating the oil scoop 20. The gear 9 is also clearly shown as a differential gear, with the appropriate difference in teeth numbers to correspond to the differences in teeth numbers on the input and output annuli 7, 8 as previously discussed. This tooth difference enables the pressurisation of the oil by the gear pumps 11.

Figure 4:
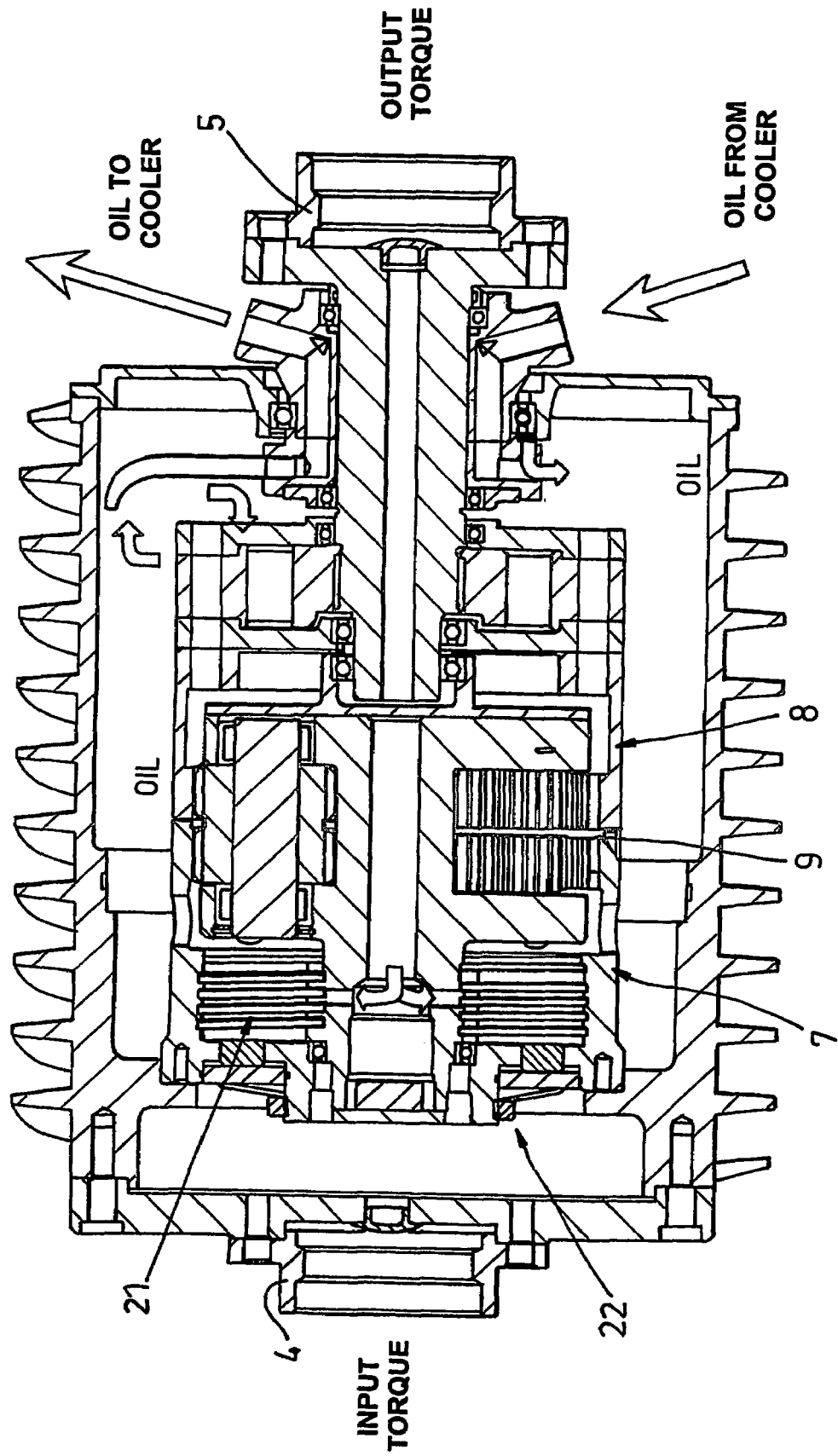
FIG. 4 is an equivalent view to FIG. 3 of an alternate embodiment utilising a friction clutch.

Turning to FIG. 4, the design is substantially similar except that the gear pumps and pressure relief valve 12 have been functionally replaced by clutches 21, which prevent rotation of the gears 9 until the predetermined torque level is reached. The torque level is set by adjusting the nut 22. If, as previously mentioned, the input annulus has 89 teeth and the output annulus has 94 teeth, then the clutch or clutches only has to absorb five units of torque, which will pass through the carrier 6 and so may be sized accordingly. By changing the epicyclic ratio this fraction may be varied to suit the requirements of a particular application.

Figure 5:
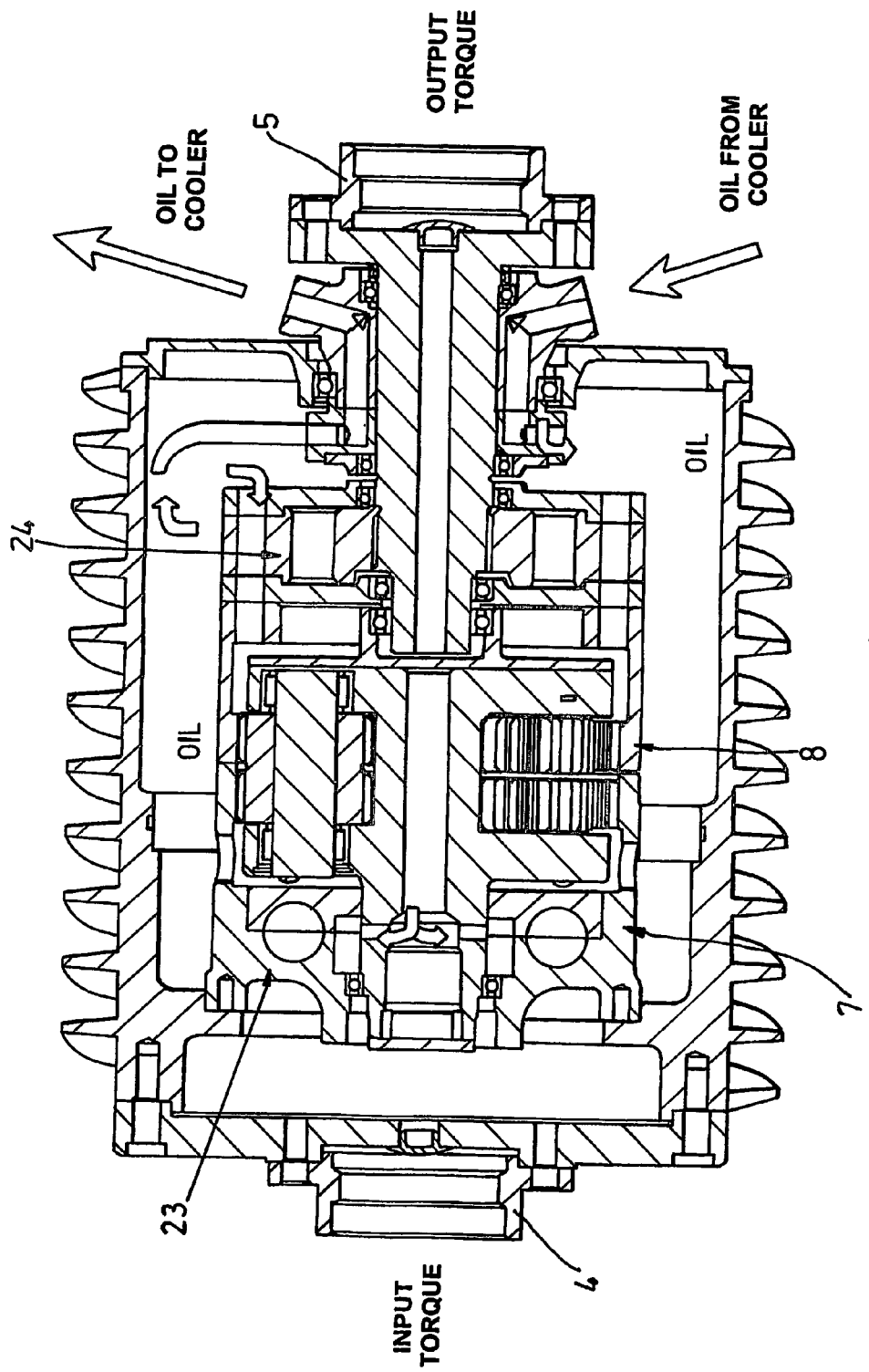
FIG. 5 is an equivalent view to FIG. 3 of a further embodiment utilising a fluid clutch.

In FIG. 5 a fluid clutch 23 replaces the friction clutch 21. It is possible this may have a small amount of continuous slip, but as that only applies to a very small percentage of the total power, for practical purposes it is as if the gear 9 is truly locked.

In each of FIGS. 3 to 5 a sprag clutch, as indicated at 24, is provided, which allows the generator to overrun and obviates inertia problems which could arise during an emergency shutdown.

Figures 6, 7:
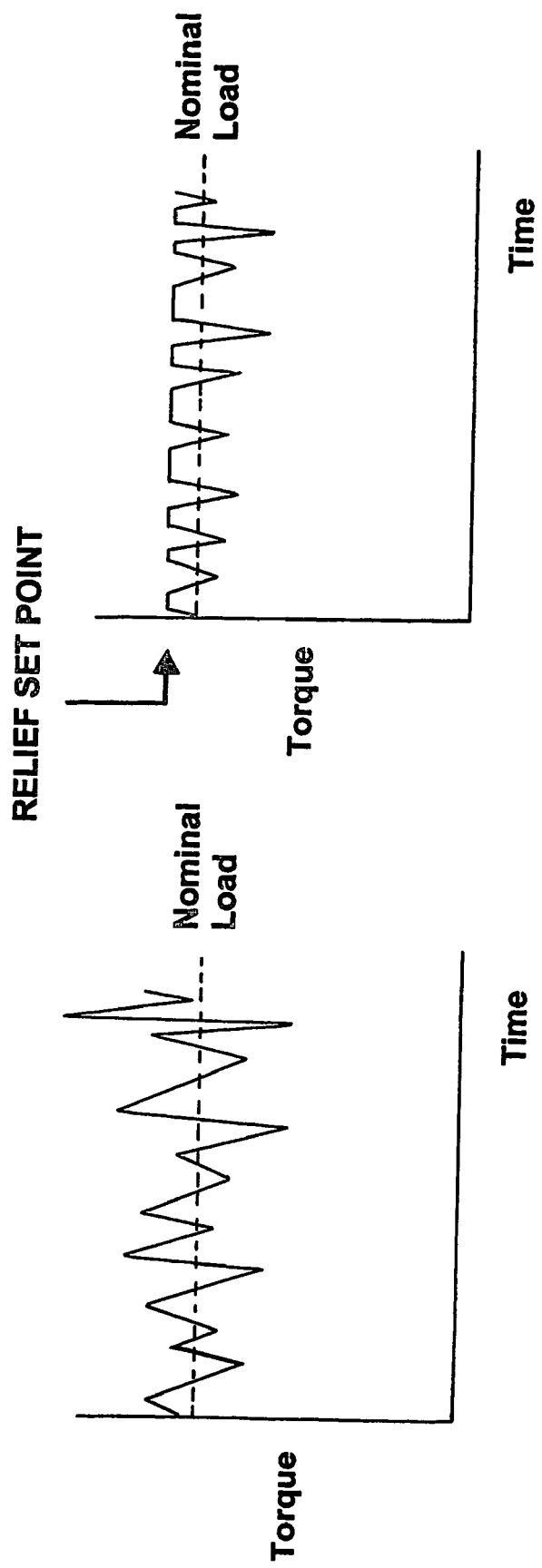
FIG. 6 is a graph illustrating typical torque response through gear box.
FIG. 7 is the equivalent graph for a torque-limiting coupling as illustrated in FIG. 3 to 6.
Figure 8:
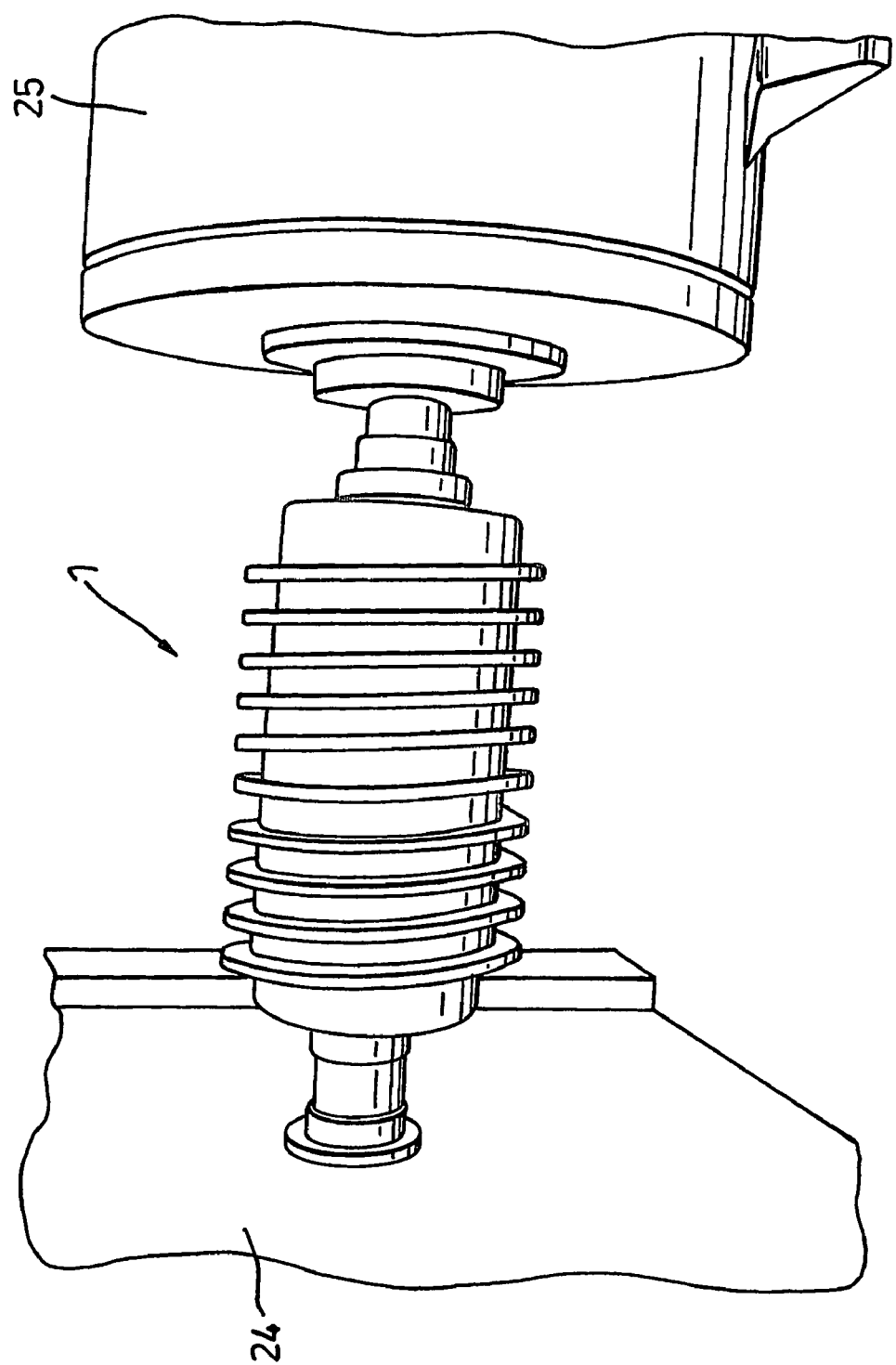
FIG. 8 illustrates the connection of a torque connector between a power source and a generator.

The effect of the torque limiting couplings is well illustrated in FIGS. 6 and 7. FIG. 6 illustrates the torque excursions of a typical gearbox, whilst that of FIG. 7 illustrates the torque output of the present embodiments. FIG. 8 shows how the torque coupling I can be connected between a power source 24, such as a windmill blade and a generator 25.

Figure 9:
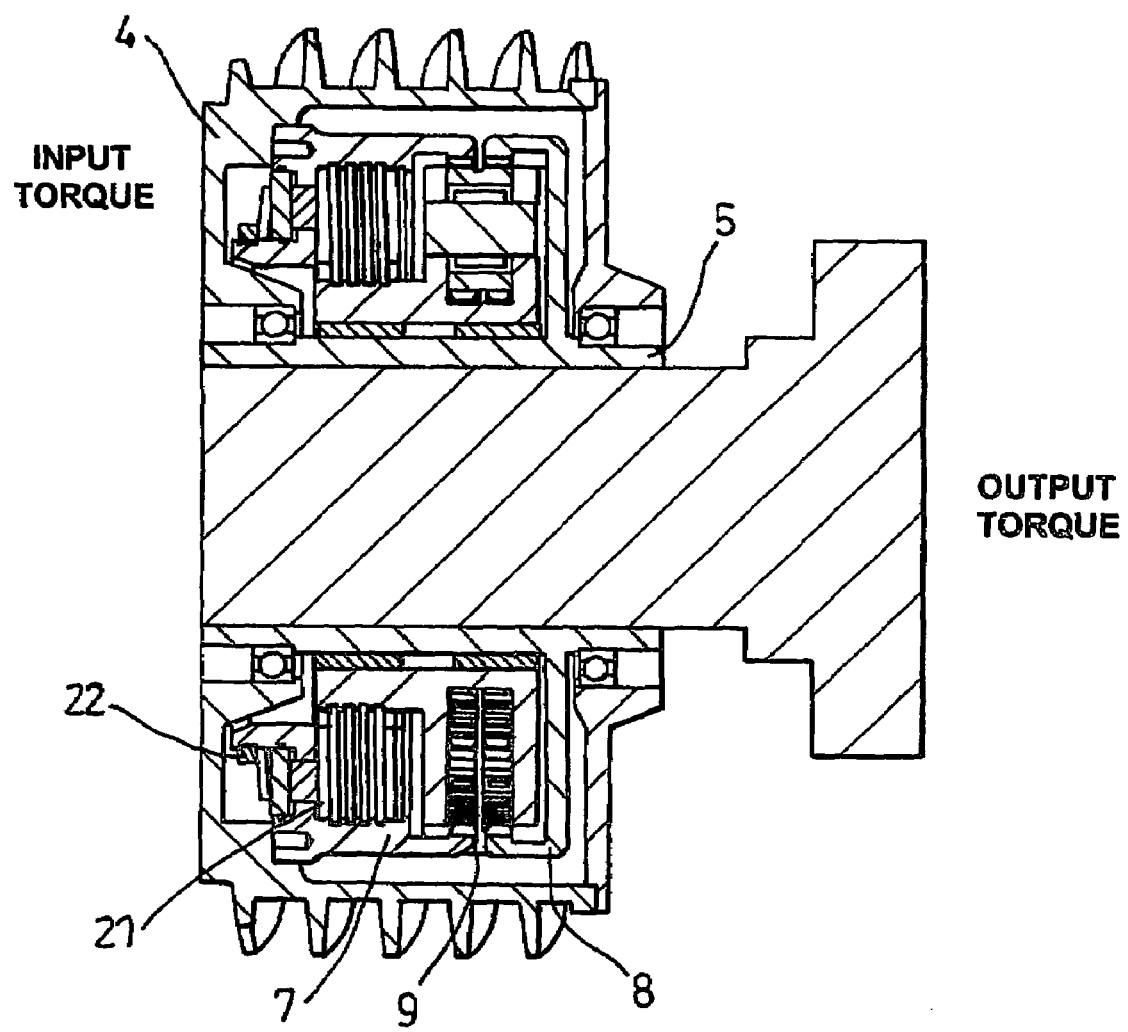
FIG. 9 is a cross-sectional view of an alternative configuration of the embodiment of FIG. 4 which is designed to sit on the input shaft of the generator.
Figure 10:
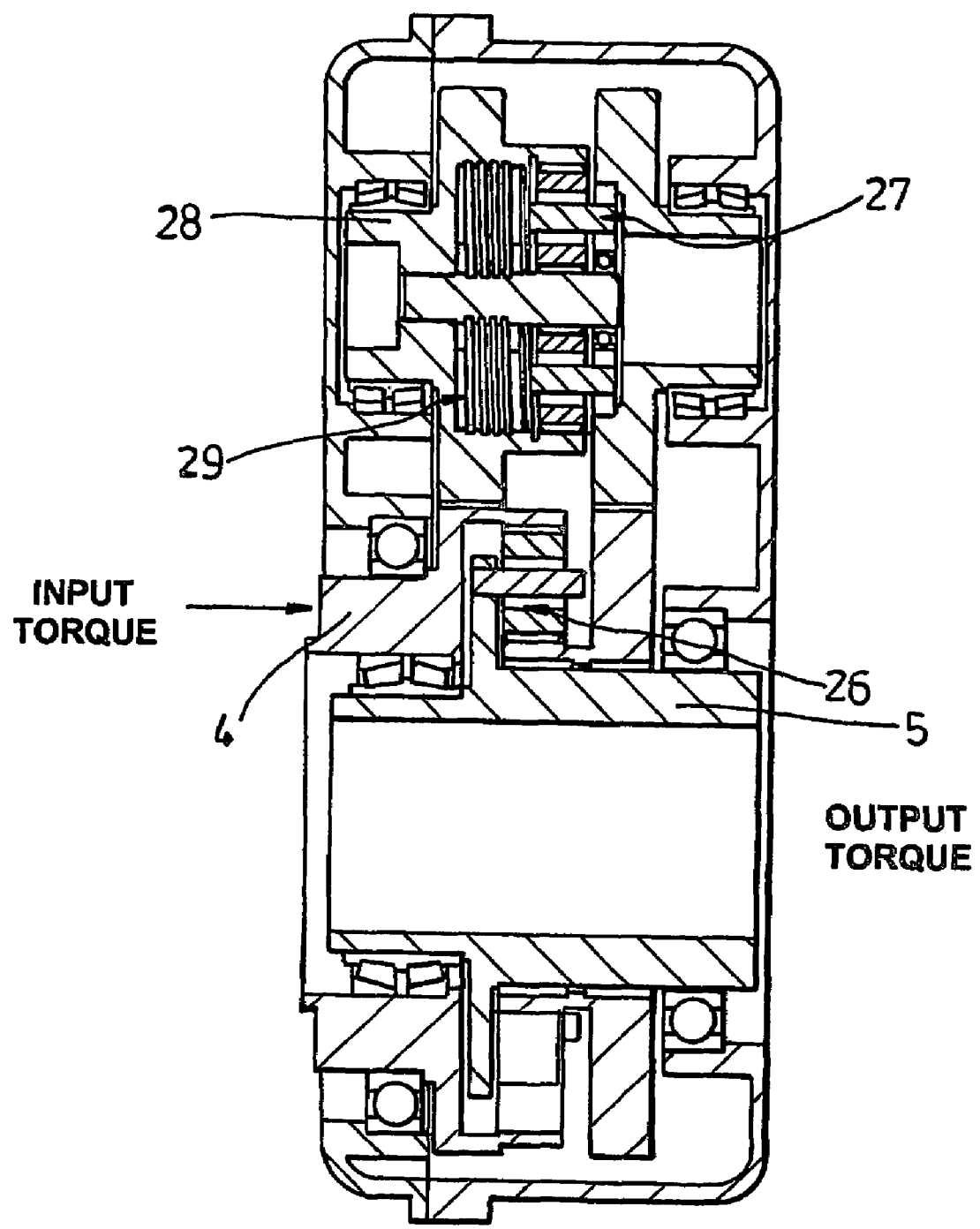
FIG. 10 is a cross-sectional view of a torque limiting coupling having an alternative gear train arrangement.
Figure 11:
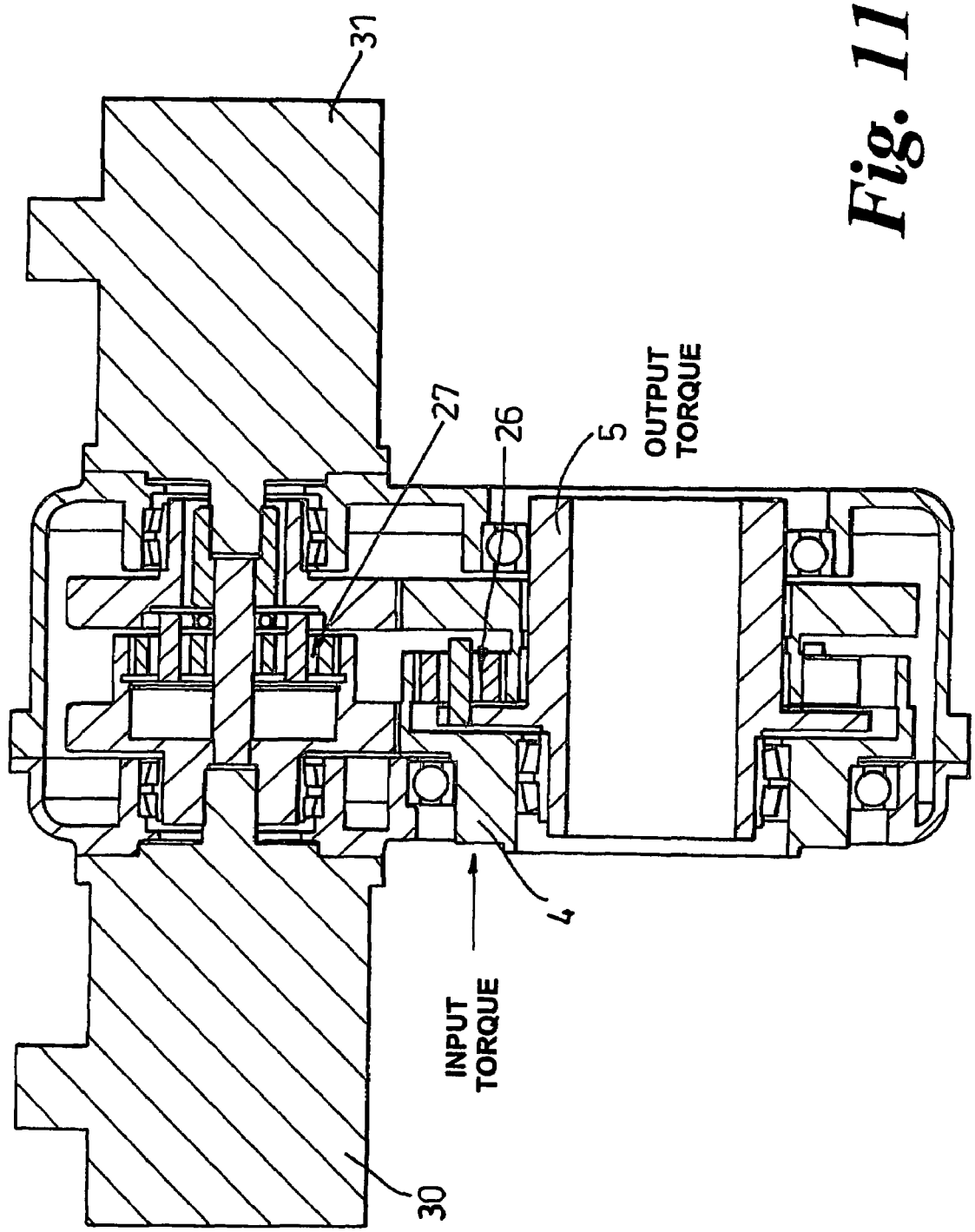
FIG. 11 is an alternative version of the FIG. 10 construction in which a variable ratio transmission is substitute for the friction clutch.

It is believed that certain manufacturers of wind turbines will be unhappy about such a location for the coupling 1, because they may envisage radial stability problems and FIG. 9 to 11 illustrate arrangements where the torque limiting coupling 1 can be mounted directly on the input shaft 25 of the generator 24. Thus in FIG. 9 it will be seen that the arrangement of FIG. 4 has been reconfigured so as to encircle the shaft 25, but the operation and layout is essentially identical to the previous proposal. This significantly enhances radial stability.

FIG. 10 on the other hand shows a slightly different approach. Here the input 4 is directly coupled to the output 5 by a primary epicyclic train, generally indicated at 26 and indirectly by a secondary epicyclic train 27, which is drivingly connected to a reaction member 28 by a friction clutch 29, the reaction member itself being drivingly connected to the input 4. Under normal torque conditions the secondary and primary epicyclic trains rotate as one providing the desired 1:1 ratio, but at the torque level at which the clutch slips, then the secondary epicyclic train will rotate relative to the reaction member allowing relative rotation between the input 4 and output 5 and hence achieving the torque dissipation as before.

FIG. 11 is essentially the same configuration, except here the friction clutch has been replaced by variable ratio hydraulic connection having a reaction pump 30 and a control pump 31. By suitable operation of the control pump 31, the ratio between the reaction member and the secondary epicyclic train can be varied to give the desired level of torque limitation and dissipation.

The offsetting of the gear box, as shown in FIGS. 10 and 11, allows easier access for oil cooling lines and, in FIG. 11, the location and control of the pumps 30, 31.

The present invention, has clear advantages in that by using positively displaced fluid flow which can be locked, for example hydraulically the torque-limiting coupling provides a transmission which is capable of transmitting substantially full power through normal gear couplings while using normal toothed gearing which only has to transmit the bypass power to be absorbed (typically 5%). By using an epicyclic arrangement in particular, torque and oil flow are directly related to the percentage of power 'slipped'. The slippage allows the driven half coupling speed to increase transiently whilst allowing the driven half coupling to maintain the constant generator speed. Thus, as slippage through gear teeth is substantially eliminated by using hydraulic locking, losses in power are minimised.

The invention claimed is:

1. A torque limiting coupling including
 (a) an input gear and an output gear; and
 (b) a gear train interconnecting the input and output gears, including a torque limiting device;
 wherein said torque limiting device retains the gear train to prevent relative rotation of the gear train and the input and output gears, to provide a 1:1 input/output ratio below a predetermined level of input torque and releases the gear train to allow relative rotation between the input and output gears at or above the predetermined level whereby excess torque is absorbed, and wherein the gear train is connected in parallel with the input and output gears and has two parts, one drivingly connected to the input gear and one drivingly connected to the output gear, and has a clutch or variable connection between the parts and gears whereby below the predetermined level the gear train is locked and above the predetermined level the two parts can rotate relative to each other.

2. A coupling as claimed in claim 1, wherein the input and output gears are mounted on a common rotatable carrier and the input gear has fewer teeth than the output gear to determine the extent of relative rotation.

3. A coupling as claimed in claim 2, wherein the torque limiting device includes at least one gear pump coupled to the gear train and acting in a sense to pressurize a chamber closed by a pressure relief valve such that until the pressure in the chamber reaches a predetermined level, determined by the pressure relief valve, the gear pump, and hence the gear train, is locked, but when the pressure relief valve opens, the pump and hence the gear train can rotate allowing relative rotation between the input and output gears.

4. A coupling as claimed in claim 1, wherein the torque limiting device includes a clutch connected in the gear train to lock the gear train below a predetermined level of torque and to allow rotation of the gear train and hence relative rotation between the input and output gears above or at the predetermined level.

5. A coupling as claimed in claim 4, wherein the clutch is a friction clutch or a fluid clutch.

6. A coupling as claimed in claim 1, wherein the variable connection alters the predetermined level to vary the effective ratio between the input and output gears.

* * * * *